United States Patent
Wachendorf et al.

(10) Patent No.: US 9,892,284 B2
(45) Date of Patent: Feb. 13, 2018

(54) TRUSTED EXECUTION THREAD IN AN EMBEDDED MULTITHREADED SYSTEM

(71) Applicant: Lantiq Beteiligungs-GmbH & Co. KG, Neubiberg (DE)

(72) Inventors: Olaf Wachendorf, Unterhaching (DE); Stefan Linz, Mühlacker (DE); Axel Schwender, Bad Aibling (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 0 days.

(21) Appl. No.: 14/203,996

(22) Filed: Mar. 11, 2014

(65) Prior Publication Data

US 2014/0259117 A1    Sep. 11, 2014

Related U.S. Application Data

(60) Provisional application No. 61/776,075, filed on Mar. 11, 2013.

(51) Int. Cl.
| | |
|---|---|
| *G06F 21/74* | (2013.01) |
| *G06F 21/57* | (2013.01) |
| *G06F 21/52* | (2013.01) |

(52) U.S. Cl.
CPC ............. *G06F 21/74* (2013.01); *G06F 21/52* (2013.01); *G06F 21/57* (2013.01)

(58) Field of Classification Search
CPC ........... G06F 21/52; G06F 21/57; G06F 21/74
See application file for complete search history.

(56) References Cited

U.S. PATENT DOCUMENTS

| 7,073,173 | B1* | 7/2006 | Willman ........................... 718/1 |
| 7,360,064 | B1* | 4/2008 | Steiss ..................... G06F 9/3802 |
| | | | 712/214 |
| 8,180,893 | B1* | 5/2012 | Spertus ......................... 709/224 |
| 2002/0083252 | A1* | 6/2002 | Armstrong ............. G06F 9/3851 |
| | | | 710/260 |
| 2004/0153672 | A1* | 8/2004 | Watt ...................... G06F 9/3012 |
| | | | 726/22 |
| 2005/0081020 | A1* | 4/2005 | Volp .............................. 712/228 |
| 2007/0006306 | A1* | 1/2007 | Seifert et al. ................... 726/22 |
| 2007/0016961 | A1* | 1/2007 | Vogler ...................... G06F 8/62 |
| | | | 726/30 |
| 2007/0217436 | A1* | 9/2007 | Markley et al. .............. 370/401 |
| 2008/0165800 | A1* | 7/2008 | Chen ...................... G06F 9/526 |
| | | | 370/465 |

(Continued)

OTHER PUBLICATIONS

"Building a Secure System using TrustZone Technology", ARM Security Technology, 2009, Chapters 1-7, ARM Limited.

*Primary Examiner* — Robert Leung
(74) *Attorney, Agent, or Firm* — Eschweiler & Potashnik, LLC

(57) ABSTRACT

A multithreaded system includes a processor core having a plurality of hardware threads. One or more of the hardware threads is dedicated to execute only trusted code and the remaining hardware threads are configured to execute untrusted code. The multithreaded system further includes a DLNA (Digital Living Network Alliance) server configured to communicate secure requests to one or more of the hardware threads dedicated to execute only trusted code and communicate other requests to one or more of the remaining hardware threads configured to execute untrusted code.

5 Claims, 3 Drawing Sheets

(56) References Cited

U.S. PATENT DOCUMENTS

| | | | |
|---|---|---|---|
| 2009/0094439 A1* | 4/2009 | Mansell et al. | 712/200 |
| 2013/0024647 A1* | 1/2013 | Gove | G06F 12/084 711/207 |
| 2013/0124826 A1* | 5/2013 | Merchant | G06F 9/3851 712/205 |
| 2013/0138923 A1* | 5/2013 | Barber | G06F 9/3851 712/203 |
| 2013/0152180 A1* | 6/2013 | Nair | H04L 63/0823 726/6 |
| 2013/0276096 A1* | 10/2013 | Symes et al. | 726/16 |

* cited by examiner

TRUSTED EXECUTION THREAD IN AN EMBEDDED MULTITHREADED SYSTEM

PRIORITY CLAIM

This application claims priority to U.S. Provisional Application No. 61/776,075 filed on 11 Mar. 2013, said provisional application incorporated herein by reference in its entirety.

BACKGROUND

A so-called trusted execution environment targets the separation and isolation of trusted applications from untrusted applications. The untrusted applications have no way to tamper or influence the execution of the trusted applications or the data processed by the trusted applications. A trusted execution environment must also authenticate the code in order to identify it as trusted and unmodified and ensure this state. Some applications ask for a remote attestation of the integrity of the system before they actually grant access to services.

For example, a separate core can be allocated to realize a trusted execution environment. Such an approach is common, but not cost optimized. A flexible system design would dedicate a complete isolated core for the trusted execution environment. A complete dedicated core is expensive and must be dimensioned for the highest possible load, and unused cycles cannot be used by the untrusted applications.

In another example, a software hypervisor is a micro kernel which sits between the hardware and the normal OS (operating system). The software hypervisor fully controls the hardware and limits the OS to run in user space. Such a solution is not hardware-based, however.

The ARM 'TrustZone' provides a trust state inband signal and has a hypervisor mode in addition to unsecure/secure user and supervisor modes. The core executes trusted and untrusted code in the same, single hardware thread. By this it allows a flexible use of the CPU (central processing unit), but it spends certain efforts on the context switches. An additional single signal from the CPU indicates the trusted state towards the peripherals. A separation of multiple, independent trusted applications is possible only in combination with a hypervisor.

SUMMARY

One or more hardware threads are dedicated to execute trusted code in a multithreaded system. An additional hardware thread is far less expensive than a full core dedicated core as a trusted execution environment, and also provides a high flexibility to assign CPU cycles to the trusted and untrusted hardware threads. Such a dedicated hardware design uses less resources compared to a separate core, has less potential for security holes in software e.g. due to buffer overflows, etc., offers better performance as no context switch or register dumps are required, and has no need for security enhanced slaves (I/O MMUs—input/output memory management units) and thus less complex.

According to an embodiment of a multithreaded system, the system comprises a processor core having a plurality of hardware threads, one or more of the hardware threads being dedicated to execute only trusted code and the remaining hardware threads being configured to execute untrusted code. The multithreaded system further comprises a DLNA (Digital Living Network Alliance) server configured to communicate secure requests to one or more of the hardware threads dedicated to execute only trusted code and communicate other requests to one or more of the remaining hardware threads configured to execute untrusted code.

According to an embodiment of a method of executing trusted code by a multithreaded system having a core with a plurality of hardware threads, one or more of the hardware threads being dedicated to execute only trusted code and the remaining hardware threads being configured to execute untrusted code, the method comprises: protecting a configuration of each hardware thread dedicated to execute only trusted code from untrusted bus masters included in the multithreaded system; verifying the authenticity of trusted code before executing the code by one of the hardware threads dedicated to execute only trusted code; communicating secure requests from a DLNA (Digital Living Network Alliance) server to one or more of the hardware threads dedicated to execute only trusted code; and communicating other requests from the DLNA server to one or more of the remaining hardware threads configured to execute untrusted code.

According to an embodiment of an apparatus, the apparatus comprises a DLNA (Digital Living Network Alliance) server configured to communicate secure requests to one or more trusted hardware threads of a multithreaded system which are dedicated to execute only trusted code and communicate other requests to one or more other hardware threads of the multithreaded system which are configured to execute untrusted code.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
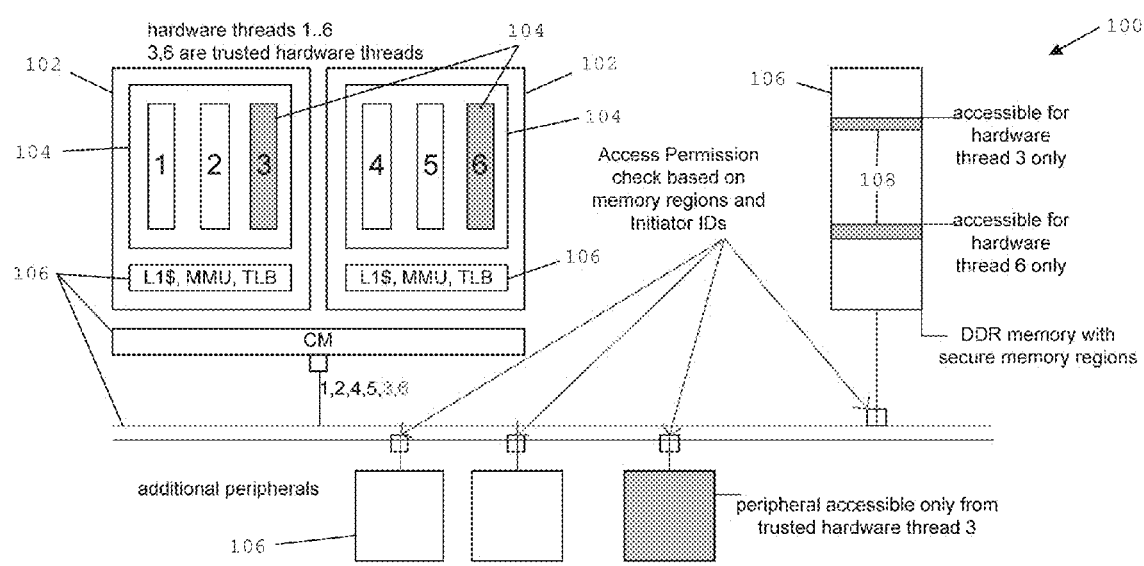
FIG. 1 illustrates a block diagram of an embodiment of a multithreaded system having one or more hardware threads dedicated to execute trusted code.

FIG. 1 shows an exemplary embodiment of a multithreaded system 100 such as a SoC (system-on-chip) having one or more cores 102 with one or more hardware threads 104 dedicated to execute trusted code. The multithreaded system 100 in FIG. 1 has two cores 102 and six hardware threads 104 (labeled '1', '2', ..., '6' in FIG. 1). Register set and program counter resources of the cores 102 are subdivided to form the hardware threads 104. The resources of the cores 102 can be shared between the different hardware threads 104. Two of the hardware threads 104 are dedicated as trusted hardware threads 104' for executing trusted code (labelled '3' and '6' in FIG. 1). In general, the number of trusted and untrusted hardware threads 104, 104' in a specific system can be chosen flexibly depending on the system requirements. The multithreaded system 100 also has shared resources 106 such as caches (L1$), memory management units (MMU), translation lookaside buffers (TLB), cache coherency manager (CM), memory (labeled in FIG. 1 as 'DDR memory'), buses, peripherals, an initiator for controlling thread access to the peripherals and memory, etc.

The multithreaded system 100 ensures that only trusted code is executed on the trusted hardware threads 104'. In order to ensure this, two conditions must be satisfied in one embodiment. First, the configuration of each trusted hardware thread 104' is protected from other hardware threads 104 on the same CPU, other CPUs or in general all other (untrusted) bus masters 102 in the system 100 e.g. in order to prevent them to stop the execution of trusted code, reception of specific interrupts or even the execution of untrusted code. This can be achieved by limiting the (write) access to the respective configuration registers to the trusted thread 104'. The authenticity of the trusted code is also verified before it can be executed. Usually this is done by a secure boot process, e.g. following a chain of trust from trusted and non-modifiable boot ROM (read-only memory) code and using other non-volatile credentials (e.g. cryptographic certificates) stored within the chipset. Each boot step verifies the authenticity of the next boot step before the code is executed. Any mismatch in the verification of the authenticity results in boot failure. Often the authenticity check is combined with encryption, in order to protect the key material for the next boot stage.

The rest of the multithreaded system 100 (e.g. the caches and the interconnect itself and implicitly the other peripherals in the system) sees an initiator ID for all requests. All accesses of the trusted hardware thread(s) 104' are uniquely identified by a dedicated initiator ID. Different initiator IDs can be assigned if more than one trusted hardware thread 104' exists in the system 100. Access permissions can be defined for peripherals or interfaces as well as for internal or external memory depending on the initiator ID. Such access permissions can be defined either on the level of the interconnect or at the peripheral, for example.

According to this scheme, specific memory regions 108 can be configured read-only or completely inaccessible to untrusted hardware threads while specific trusted hardware threads 104' may have full access. These regions 108 of memory are labeled 'accessible for hardware thread 3 only' and 'accessible for hardware thread 6 only' in FIG. 1. Each trusted hardware thread 104' can even limit the access permissions on code segments for itself to read-only (r/o) and correspondingly reduce the need for continuous runtime integrity checks, e.g. verification that the program code hasn't been tampered.

The trusted hardware threads 104' allow different software architectures. In a first embodiment, individual functions are executed in the trusted thread(s) 104'. A simple queue handler is sufficient to handle the function calls on the trusted thread 104'. In a second embodiment, trusted applications are executed on the trusted hardware thread(s) 104'. In order to schedule between them and exchange information with the untrusted threads, a minimalistic operating system can schedule among multiple trusted applications. One specific implementation of such a minimalistic operating system can be a hypervisor. In a third embodiment, the untrusted threads can be isolated i.e. the same basic architecture also allows to inverse the logic, e.g. by defining an untrusted hardware thread which is limited and isolated from the rest of the system 100.

Figure 2:
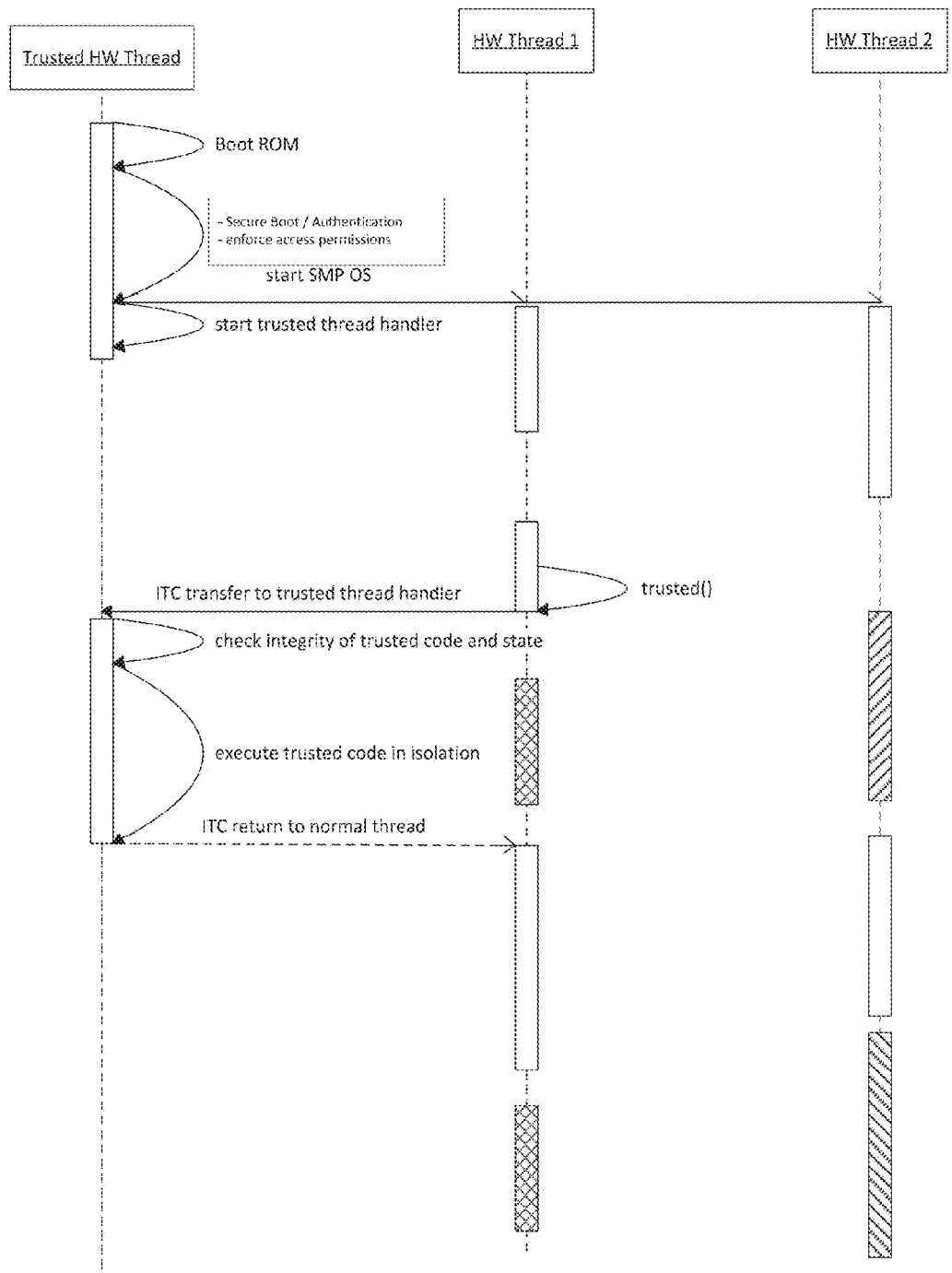
FIG. 2 illustrates a flow diagram of an embodiment of executing trusted code by a multithreaded system having one or more hardware threads dedicated to execute trusted code.

FIG. 2 illustrates an embodiment of the multithreaded system architecture, in the form of a sequence diagram. The system starts up from the boot ROM, via a so-called 'secure boot' procedure which is a technique to authenticate and optionally decrypt each step in the system boot sequence by the previous one.

The access permissions are also configured in order to ensure full separation of the trusted thread(s) (e.g. thread-related registers must not be accessible by other threads) from the untrusted portions. This way secure (memory) regions can be achieved. Each unauthorized access to secure regions from untrusted threads can be reported and handled accordingly.

The untrusted operating systems are supported on the remaining hardware threads. In one embodiment, trusted thread handler code is started on the corresponding trusted hardware thread. The purpose of the trusted thread handler code is to execute the trusted code, e.g. code that is authenticated and not tampered, on the trusted hardware thread on behalf of an untrusted application. The trusted thread handler can be triggered from the untrusted side e.g. via inter-thread communication (ITC). The trusted thread handler can prepare a secure memory region not accessible to all other hardware threads, (decrypt) and store the trusted code to the secure memory region, switch the memory to read-only only to the trusted hardware thread, and authenticate the trusted code. For recurring functions, an optimization can include performing these functions (preparing a secure memory region, (decrypting) and storing the trusted code, switching the memory to read-only, and authenticating the trusted code) only the first time. Because the memory region is switched to read-only, the code is still trusted. In each case, the trusted thread handler then (schedules and) executes the trusted code.

Each trusted hardware thread can be uniquely identified by the interconnect (i.e. buses/connections), allowing the interconnect to limit access to memory (secure memory) or other subsystems/targets i.e. so-called interconnect based security. At the end of the trusted code execution, control is returned to the process running on the untrusted hardware thread.

The embodiments described with regard to FIG. 1 add additional flexibility, e.g. allow runtime integrity checks or parts of the code to be executed there. The fundamental mechanisms of the invention remain the same.

Figure 3:
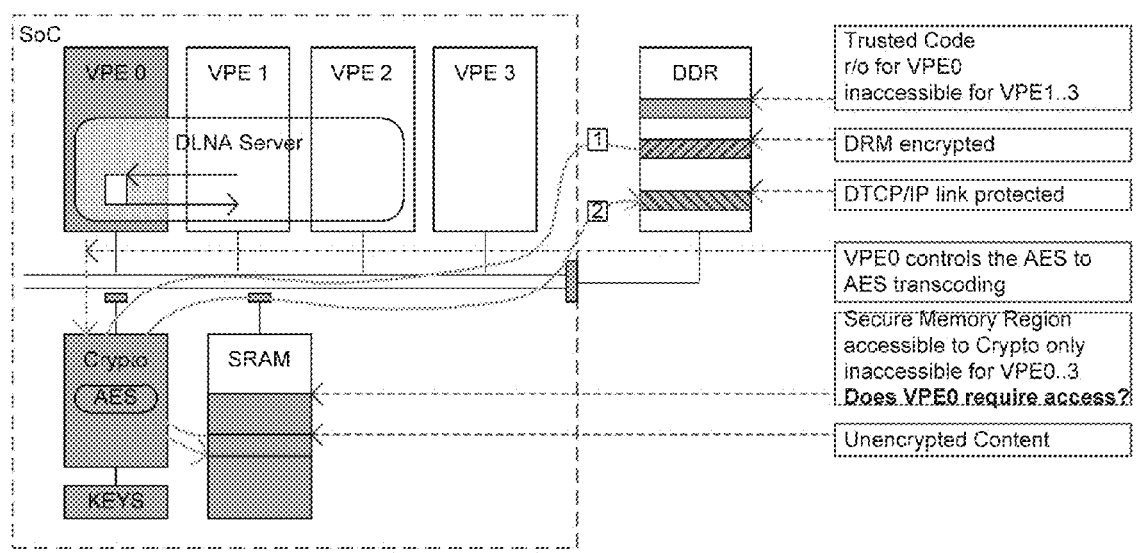
FIG. 3 illustrates a block diagram of an embodiment of a multithreaded system having one or more hardware threads dedicated to execute trusted code in a DLNA application.

FIG. 3 illustrates an embodiment of the multithreaded system techniques described herein, in the context of a DLNA (Digital Living Network Alliance) application. DLNA is a non-profit collaborative trade organization that defines interoperability guidelines to enable sharing of digital media between multimedia devices.

In the purely exemplary DLNA example shown in FIG. 3, it is assumed that the secure boot sequence has been executed as described previously herein e.g. the chain of trust has authenticated and most likely als-decrypted the next stage boot loader or OS (operating system) image. This example describes a DLNA CVP2 (Commercial Video Profile) application, where premium content protected by some DRM (digital rights management) scheme (on the fly or from local storage) is being re-encrypted to a link protection scheme (e.g. DTCP/IP). The motivation for this centralized DRM termination and transcoding is to bring the premium content to all displays within the home and potentially eliminating the need for set-top boxes for each screen (maybe in some cases a slim/reduced set-top box is still required).

A conventional DLNA server serves mainly local, unprotected content and uses to be a monolithic binary. In order to protect the routines dealing with the transcoding of premium content (DRM termination, re-encryption with the link protection scheme/keys) and the enforcement of the granted permissions, certain routines should be tamper proof/robust. One way of achieving this is to split the DLNA server into a trusted part (indicated to run on VPE0 in the above example) and a less trusted part (running on VPE1+2 in the above example), where 'VPE' refers to a virtual processing element. According to the embodiments described herein, the interconnect is enabled to safely identify the initiator in the form of a hardware thread of a certain request and thus define certain access permission schemes. The mechanism to filter for initiator and address regions (SONICS) is known to those of ordinary skill in the art, and therefore no further explanation is given in this regard.

Whenever the DLNA server is required to deal with secure request such as DRM termination, enforcement of granted license terms, re-encryption with the link protection scheme, etc. the DLNA server will communicate such requests to the trusted hardware thread. Different methods can be applied for communication between the trusted and less trusted hardware threads. The code on the trusted hardware can be authenticated and possibly protected by turning the memory region to be read-only to VPE0 and not accessible to all other VPEs. This way there is no need for a runtime integrity check of the trusted code.

The trusted code on the VPE0 can now initiate the DRM termination, e.g. basically decryption of the premium content after revealing the respective keys (depending on the DRM scheme). The access to the crypto engine as well as the storage for the unencrypted premium content are protected in the same way: via interconnect based security. Furthermore, the crypto block can be a target as well as an initiator with its built-in DMA which is efficiently transferring data in the transcoding steps. This means the memory region in SRAM is read/write to the crypto engine as well as possibly to VPE0 in this example. The re-encrypted data can be stored safely in the external memory before it is sent out towards the displaying device.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A multithreaded system, comprising:
   a processor core having a plurality of hardware threads each comprising a subset of processor core hardware components, wherein one or more of the hardware threads comprise trusted hardware threads configured include at least a hardware register being dedicated to execute only trusted code and wherein the remaining hardware threads are being configured to execute only untrusted code, wherein the one or more trusted hardware threads include at least one hardware register that is dedicated to the trusted hardware threads and is not included in the remaining hardware threads; and
   a DLNA (Digital Living Network Alliance) server comprising a first part and a second part, wherein the first part is a trusted part, and configured to communicate, via the first part, secure requests to one or more of the trusted hardware threads dedicated to execute only trusted code and communicate, via the second part, other requests to one or more of the remaining hardware threads configured to execute untrusted code,
   wherein a configuration of each trusted hardware thread dedicated to execute only trusted code is protected from untrusted bus masters included in the multithreaded system, and wherein authenticity of the trusted code is verified before the trusted code is executed by one or more of the trusted hardware threads dedicated to execute only trusted code, said verifying comprising a secure boot process.

2. The multithreaded system of claim 1, wherein the secure requests correspond to at least one of transcoding of premium content and enforcement of granted permissions.

3. The multithreaded system of claim 1, wherein the hardware threads are configured to share common resources of one or more processor cores.

4. A method of executing trusted code by a multithreaded system, the method comprising:
   providing having a core with a plurality of hardware threads, each hardware thread comprising a subset of processor core hardware components, wherein one or more of the hardware threads comprises a trusted hardware thread configured include at least a hardware register being dedicated to execute only trusted code and the remaining hardware threads are being configured to execute untrusted code, wherein the one or more hardware threads include at least a hardware register that is dedicated to the trusted hardware thread and is not included in the remaining hardware threads;
   the method comprising:
   protecting a configuration of each trusted hardware thread dedicated to execute only trusted code from untrusted bus masters included in the multithreaded system;
   verifying the authenticity of the trusted code before executing the trusted code by one of the trusted hardware threads dedicated to execute only trusted code, said verifying comprising a secure boot process;
   communicating secure requests from a DLNA (Digital Living Network Alliance) server, via a first part of the DLNA server said first part being a trusted part, to one or more of the trusted hardware threads dedicated to execute only trusted code; and
   communicating other requests from the DLNA server, via a second part of the DLNA server, to one or more of the remaining hardware threads configured to execute untrusted code.

5. The method of claim 4, wherein the secure requests correspond to at least one of transcoding of premium content and enforcement of granted permissions.

* * * * *